United States Patent
Thomson (10) Patent No.: US 6,627,134 B2
(45) Date of Patent: Sep. 30, 2003

(54) APPARATUS FOR MOLDING MULTILAYERED ARTICLES

(75) Inventor: Joel Thomson, Elka Park, NY (US)

(73) Assignee: Community Enterprises, LLC, Rifton, NY (US)

(*) Notice: Subject to any disclaimer, the term of this patent is extended or adjusted under 35 U.S.C. 154(b) by 0 days.

(21) Appl. No.: 09/850,696

(22) Filed: May 8, 2001

(65) Prior Publication Data
US 2002/0041912 A1 Apr. 11, 2002

Related U.S. Application Data

(60) Provisional application No. 60/230,546, filed on Sep. 5, 2000.

(51) Int. Cl.[7] .................. B29C 45/16; B29C 45/52
(52) U.S. Cl. .............. 264/255; 264/328.8; 264/328.17; 264/349; 366/78; 366/83; 425/130; 425/204; 425/587
(58) Field of Search ............... 264/173.16, 211.23, 264/255, 328.8, 328.17, 349; 366/78, 83, 293, 294; 425/130, 133.1, 204, 209, 582, 583, 587

(56) References Cited

U.S. PATENT DOCUMENTS

| | | | |
|---|---|---|---|
| 1,271,406 A | | 7/1918 | Winfrey |
| 1,647,683 A | | 11/1927 | Bollinger |
| 2,769,201 A | | 11/1956 | Lorenian |
| 3,021,561 A | * | 2/1962 | Reifenhauser |
| 3,300,811 A | * | 1/1967 | Berger |
| 3,570,569 A | * | 3/1971 | Hartley |
| 3,966,372 A | | 6/1976 | Yasuike et al. |
| 3,999,921 A | | 12/1976 | Thor et al. |
| 4,029,841 A | * | 6/1977 | Schmidt |
| 4,094,946 A | | 6/1978 | Finkensiep et al. |
| 4,164,385 A | | 8/1979 | Finkensiep |
| 4,574,690 A | * | 3/1986 | Chiao et al. |
| 4,601,653 A | * | 7/1986 | Inaba .................. 366/79 |
| 4,643,661 A | | 2/1987 | Chszaniecke |
| 4,802,140 A | | 1/1989 | Dowling |
| 4,859,068 A | * | 8/1989 | Sironi |
| 4,892,699 A | | 1/1990 | Kudert et al. |
| 4,978,493 A | * | 12/1990 | Kersemakers et al. |
| 5,443,378 A | | 8/1995 | Jaroschek et al. |
| 5,503,788 A | * | 4/1996 | Lazareck et al. |
| 5,614,227 A | | 3/1997 | Yarbrough |
| 5,670,112 A | | 9/1997 | Csongor et al. |
| 5,932,154 A | | 8/1999 | Csongor et al. |
| 6,287,491 B1 | * | 9/2001 | Kilim et al. |

FOREIGN PATENT DOCUMENTS

| | | | |
|---|---|---|---|
| DE | 4434546 | * | 12/1995 |
| DE | 19744665 | * | 12/1998 |
| JP | 54-124068 | * | 9/1979 |

OTHER PUBLICATIONS

English-language translation of German Patent Document No. DE 44 34 546 C1 to Pritzke.

* cited by examiner

*Primary Examiner*—Jill L. Heitbrink
(74) *Attorney, Agent, or Firm*—Cooper & Dunham LLP

(57) ABSTRACT

An apparatus for injection molding two compatible polymeric materials, in which two substantially coaxial extrusion screws are used to plasticize the two materials into a common accumulation space. The charge comprising multiple layers of material is then injected into a closed mold by means of forward axial motion of the outer screw with respect to its enclosing barrel. Once inside the mold, the first material forms a skin layer totally or partially surrounding the other material. In this way a part having a plurality of material properties may be produced in a single operation.

14 Claims, 6 Drawing Sheets

APPARATUS FOR MOLDING MULTILAYERED ARTICLES

CROSS REFERENCE TO RELATED APPLICATIONS

This application claims the benefit of U.S. Provisional Application No. 60/230,546 filed Sep. 5, 2000.

BACKGROUND OF THE INVENTION

The most common commercial form of injection molding machine is known as a "reciprocating screw". In this type of machine, thermoplastic polymer is melted, mixed, and conveyed by means of a screw having one or more flights rotating within a heated pressure vessel. The screw is also permitted to translate axially to allow for the accumulation of melted material at the end of the screw. When sufficient melt has accumulated, the screw is stopped and translated forward to inject the melted material into a closed mold. In common practice a non-return valve is situated at the downstream end of the screw to prevent back flow into the screw flights during the injection portion of the cycle.

Figure 1:
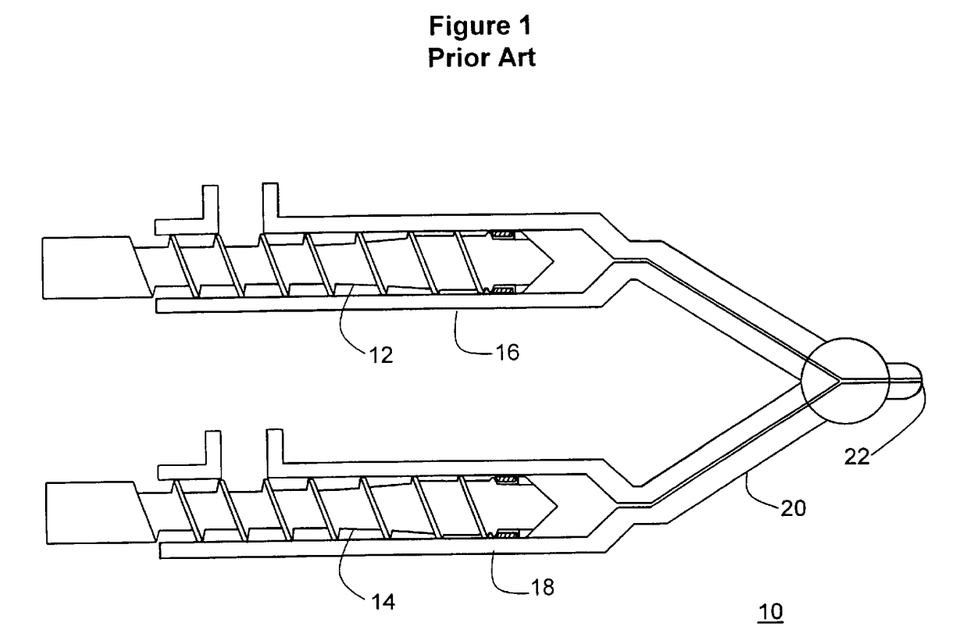
FIG. 1 illustrates a device used for traditional co-injection molding which includes two injection barrels and a manifold to join the melt streams as the streams are being injected.
Figure 2:
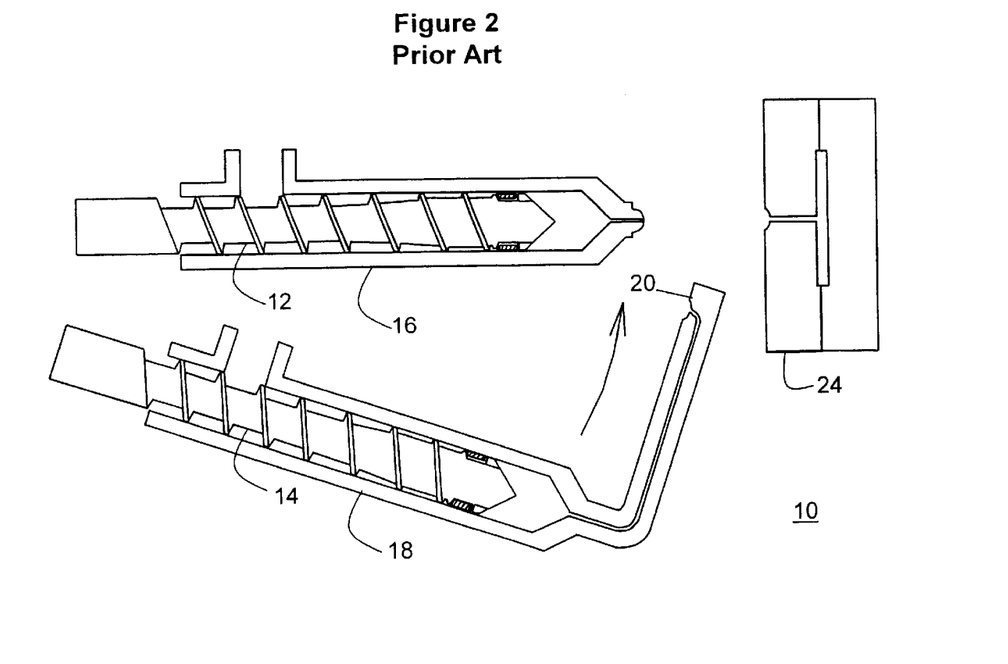
FIG. 2 illustrates another device used for traditional co-injection molding which includes two injection barrels sharing a single accumulator space.

A variation of this process, known as co-injection or sandwich molding, has been commercially practiced for a number of years. In its most common embodiments shown in FIGS. 1 and 2, co-injection is achieved by means of a molding machine fitted with two or more plasticizing units, each one containing a reciprocating screw 12, 14 enclosed in a separate heated barrel 16, 18. The output of these plasticizing units is brought together by a system of manifolds 20 which convey the several materials to the point of injection 22 into the mold 24. According to well known principles of viscous flow, the first material to enter the mold remains substantially on the outside of the molded part, and material injected later remains substantially in the core of the part. The resulting "sandwich" construction yields a number of advantages, the principle ones being: (1) to make a part with a chemically foamed core, gaining the light weight, low pressure, and flat surfaces of a foam part without the characteristic streaky exterior, (2) to use low cost recycled, "off-spec" or uncolored material where it is not visible, and (3) to make a part with different properties on the inside and outside, as for instance the presence or absence of reinforcing fibers or other property-changing additives.

These advantages are offset by the high cost and complexity of a machine requiring two or more independent reciprocating screws, together with the associated controls for simultaneous and/or sequential injection. Numerous attempts have therefore been made to reduce this complexity by having at least the injection function be performed by a single element, building a composite shot containing a plurality of melted materials within a single accumulation space. Examples of these attempts include U.S. Pat. No. 4,978,493 to Kersemakers et al., U.S. Pat. No. 3,966,372 to Yasuike et al., and U.S. Pat. No. 5,443,378 to Jaroschek et al. In all of these examples, at least one secondary extrusion screw and barrel is caused to communicate with the primary barrel by means of a melt-carrying manifold structure through which the secondary portion of the shot is charged. Because of the multiple barrels and screw drives, machines of this type still have disadvantages involving the high initial cost of the required components and associated control capability.

SUMMARY OF THE INVENTION

One object of the present invention is to provide a device and method whereby the sandwich molding process can be performed within the space of a single heated barrel, and furthermore by means of a machine having a single rotational screw drive.

Another object of the present invention is provide a device and method for making possible adaptation of a conventional single-material molding machine to perform the sandwich molding process with relatively minor and low-cost changes.

A further object of the present invention is to provide an injection unit having an externally heated pressure vessel hereafter called the "barrel" enclosing a primary, outer, screw having one or more flights. The screw being movable rotationally and axially to respectively plasticize and inject a metered quantity of melted thermoplastic material. The screw has a hollow cylindrical bore extending through its length which forms the enclosure for a second, inner, screw having a smaller diameter than the primary screw. The secondary screw remains substantially fixed in its axial orientation with respect to the primary screw, but can be rotated within the primary screw to plasticize material. The downstream end of the bore in the primary screw is provided with an opening to allow material from the secondary screw to be extruded into an accumulation space in front of the primary screw. The opening is preferably provided with a non-return valve to keep material from leaking back into the secondary screw.

Another object of the present invention is to provide a clutch mechanism between the primary and secondary screws to transmit rotation to the respective screw elements. Rotational motion is applied by means of a hydraulic or electric motor to the upstream end of the secondary screw. With the clutch closed, relative rotation occurs only between the primary screw and the outside barrel causing primary material to be extruded. With the clutch opened, relative rotation occurs between the two screws, causing secondary material to be extruded.

Another object of the invention is to provide a secondary feed throat to convey granular raw material to the inner screw through openings cut through the wall of the hollow outer screw.

A further object of the invention is to provide a machine for forming objects having: (1) a first rotatable screw; (2) a second rotatable screw; and (3) a single screw drive for selectively causing rotation of the first rotatable screw and the second rotatable screw. This machine can also include: (a) a single barrel containing the first rotatable screw and the second rotatable screw; and/or (b) a clutch for selectively connecting the single screw drive to one of: (1) the first rotatable screw; and (2) both the first rotatable screw and the second rotatable screw. Furthermore, the first rotatable screw and the second rotatable screw can be substantially coaxial. Also, the first rotatable screw can operate on a first material; and the second rotatable screw can operate on a second material such that each of the objects is formed from a combination of the first material and the second material.

An additional object of the invention is to provide a machine for forming objects having: (1) a barrel; (2) a first rotatable screw; (3) a second rotatable screw; and (4) an accumulation space for forming a shot, such that the barrel surrounds at least a portion of each of the first rotatable screw, the second rotatable screw, and the accumulation space. Also, the first rotatable screw can operate on a first material; the second rotatable screw can operate on a second material; and the shot formed in the accumulation space can contain first material and second material. Further, the first material can be a skin material; the second material can be a core material; and at least one of the first rotatable screw and the second rotatable screw can inject the shot into a mold such that skin material encapsulates core material. In addition, the accumulation space can enlarge when at least one of the first rotatable screw and the second rotatable screw move axially.

Another object of the invention is to provide a screw assembly for a machine for forming multi-material objects having: (1) an outer screw for operating on a first material, the outer screw having a hollow inner section; and (2) an inner screw for operating on a second material positioned substantially within the hollow inner section of the outer screw; wherein at least one of the outer screw and the inner screw includes a non-return valve to prevent backflow of material into at least one of the outer screw and the inner screw. In addition, each of the outer screw and the inner screw can include a respective non-return valve. Further, the non-return valve can be selected from the group consisting of: a ball type valve, a ring type valve, and a poppet type valve.

A further object of the present invention is to provide a machine for forming objects having: (1) a hollow barrel defining a longitudinal direction; (2) a screw for operating on a material in the barrel and having an elongated tip, the screw movable in the longitudinal direction; and (3) a nozzle having an orifice for passage of material from the barrel, and a tip portion for receiving the elongated tip of the screw. In addition, the screw can have a hollow bore which continues into a passageway through the elongated tip to an outlet in the tip. Also, a second screw can be positioned within the hollow bore for operating on a second material in the hollow bore and/or the nozzle can have a storage area for retaining material until the elongated tip substantially reaches an inner face of the orifice.

An additional object of the invention is to provide a method of forming multi-material objects having the steps of: (1) engaging a screw drive to cause a first screw to extrude a first material into an accumulation space; (2) engaging the screw drive to cause a second screw to extrude a second material into the accumulation space forming a composite shot; and (3) injecting the composite shot into a mold by axial movement of at least one of the first screw and the second screw. Also, the step of engaging the screw drive to cause the first screw to extrude can include the step of increasing pressure on a clutch disc; and/or the step of engaging the screw drive to cause the second screw to extrude can include the step of decreasing pressure on the clutch disc.

Another object of the invention is to provide a method of forming multi-material objects having the steps of: (1) rotating a first screw to cause a first material to be extruded; (2) forming by axial movement of at least one of the first screw and a second screw an accumulation space having a forward side, a rearward side, and a periphery, such that the first material accumulates toward the forward side of the accumulation space; (3) rotating the second screw to cause a second material to be extruded into the accumulation space; (4) enlarging the accumulation space by additional axial movement of at least one of the first screw and the second screw, such that the second material accumulates toward the rearward side and outer periphery of the accumulation space; and (5) forcing the first and second material in the accumulation space into a mold. In addition, the axial movement can be caused by the first material exiting the first screw; and/or the additional axial movement can be caused by the second material exiting the second screw. Also, the first material can be a skin material and the second material can be a core material.

A further object of the invention is to provide a method of plugging-off a multi-material object having a core material encapsulated by a skin material having the steps of: (1) filling a storage area in at least one of a barrel and a nozzle with a portion of a skin material, the storage area positioned adjacent a path of an elongated tip of an injector; (2) moving the injector axially such that the elongated tip of the injector is received into a tip portion of the nozzle thereby injecting skin material and core material into a mold; and (3) further moving the injector such that another portion of the injector moves into the storage area thereby causing injection of the portion of skin material into the mold to plug off the object.

An additional object of the invention is to provide a method of plugging-off a multi-material object having a core material encapsulated by a skin material having the steps of: (1) filling a storage area in an elongated tip of an injector with a portion of skin material; (2) moving the injector axially such that the elongated tip of the injector is received into a tip portion of the nozzle thereby injecting skin material and core material into a mold; and (3) extruding the portion of skin material from the storage area into the mold to plug off the object.

Another object of the invention is to provide a machine for forming multi-material objects having a first screw for operating on a first material and a second screw for operating on a second material within the same barrel, each screw having a non-return value preventing backflow into either screw; and an accumulation space formed by the axial retraction of one or both screws.

DETAILED DESCRIPTION OF THE INVENTION

Figure 3:
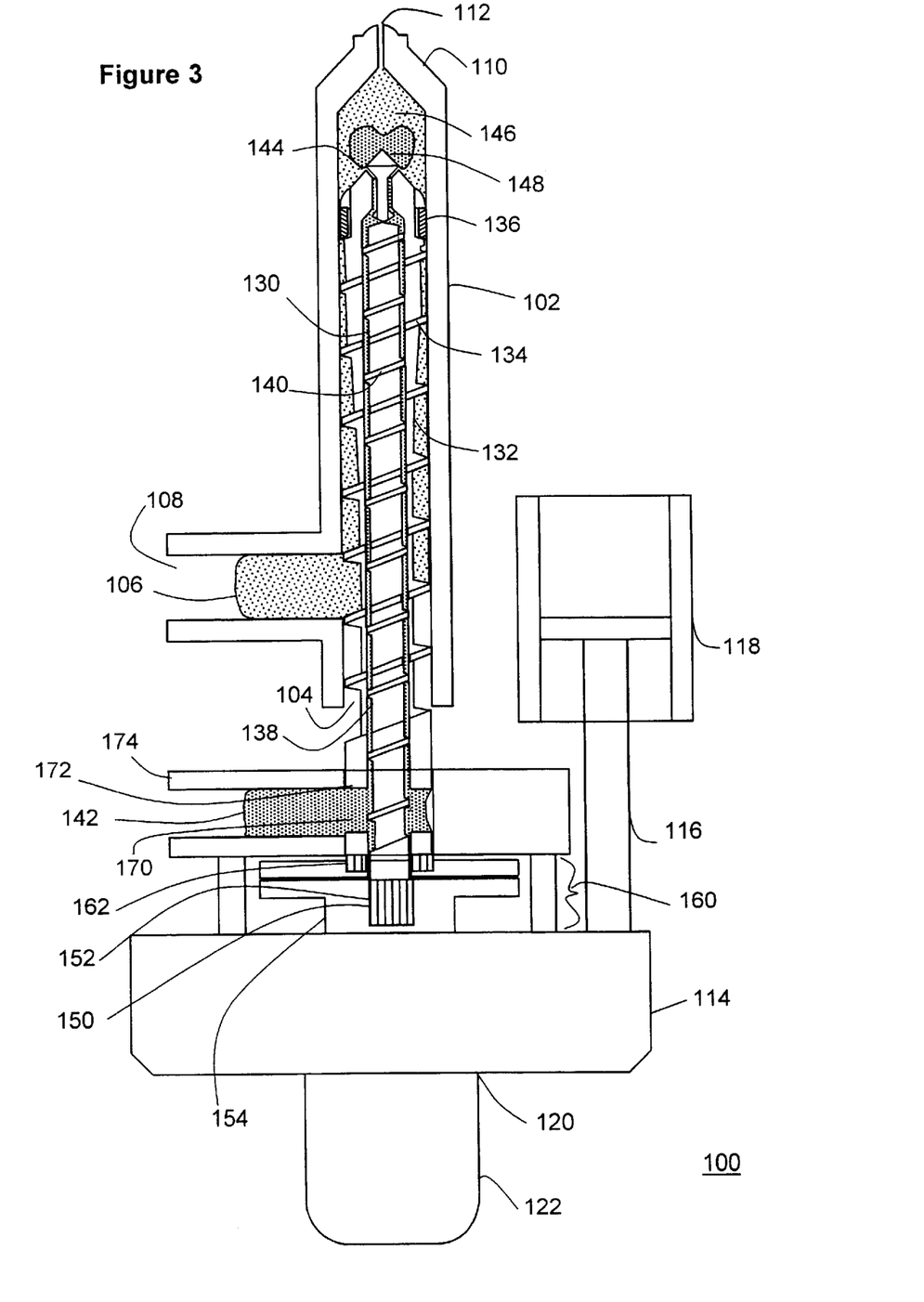
FIG. 3 is a schematic view of one embodiment of the present invention.

As shown in FIG. 3, one embodiment 100 of the present invention utilizes components from a traditional standard injection molding machine. These components include a heated cylindrical pressure vessel or barrel 102. The barrel 102 has a cylindrical bore 104 in which plastic material 106 is melted and accumulated. The barrel 102 also has an opening or feed throat 108 through which the raw material 106 is introduced into the cylindrical bore 104. The end of the bore 104 opposite to the feed throat 108 is provided with a nozzle including a substantially conical section 110 in which the bore 104 diameter is reduced to terminate in a small-diameter channel 112 which communicates with the mold (not shown).

Like a traditional standard injection molding machine, this embodiment of the present invention is further provided with an injection platen 114 mounted on guide ways 116 such that the injection platen 114 can move in a linear direction by means of hydraulic cylinders 118. In a traditional embodiment, the hydraulic cylinders 118 pull-in the platen 114 to which a single screw would be attached to provide injection force on the melt. The platen 114 further includes a mounting point 120 for a rotational drive 122 to rotate the traditional single screw. The rotational drive 122 is typically a hydraulic or electric motor capable of high torque at low rotational speeds.

The present invention departs from the form of a traditional standard injection molding machine at least in that the single plasticizing screw member is replaced by two coaxial screw members 130, 132. The outer or outside screw 132 has at least one external thread 134 to convey material forward inside the barrel 102. A means, such as an open space, is provided to allow melted material 106 to exit the end of the threaded portion of the outer screw 132 and accumulate in front of the outer screw. Further means, such as a check valve, is provided to prevent the reverse from happening, that is to keep material so accumulated from reentering the threaded portion of the outer screw 132. A ring-type check valve 136 is one traditional means for providing both these functions. The outer screw 132 is further provided with a cylindrical bore 138 which forms the enclosure for a secondary, inner or inside screw 130 of smaller diameter than the primary outer screw 132. The inner screw 130 also has at least one external thread 140 to convey and melt plastic material 142 which in turn is caused to flow through an opening 144 in the tip of the outer screw 132, into a common accumulator space 146. The opening 144 is also provided with a non-return valve 148. As melt 106, 142 is accumulated, the volume of the accumulator space 146 is allowed to increase by means of backward motion of the injection platen 114 and the screws 130e, 132 attached thereto.

Rotation of the inside screw 130 is caused by a substantially solid connection to said rotational drive 122 on the injection platen 114. Similar to the single screw of a traditional injection molding machine, splines 150 are machined into the end of the inner screw 130 and are fitted into matching splines 152 of a spline bushing in the spline shaft 154 of the rotational drive 122 which is mounted to the platen 114. A thrust bearing (not shown) is provided to protect the screw motor of the rotational drive 122 from the full injection force. Rotation of the outer screw 132 is caused by selective actuation of a clutch mechanism 160 connected on one side to splines 162 in the outer screw 132 and on the other side to the rotational drive 122. When the clutch mechanism 160 is engaged, there is no relative rotation between the inner screw 130 and the outer screw 132. When the clutch mechanism 160 is disengaged, only the inner screw 130 is powered. Optionally, means to provide braking force, such as the Belleville spring discussed below, can be provided for the outer screw 132 while the clutch mechanism 160 is disengaged.

Raw skin material 142 is introduced to the threaded portion of the inside screw 130 by means of openings 170 in the wall 172 of the hollow outside screw 132. A secondary feed throat 174 is provided to contain and direct the skin material 142 into those openings 170.

Figure 4:
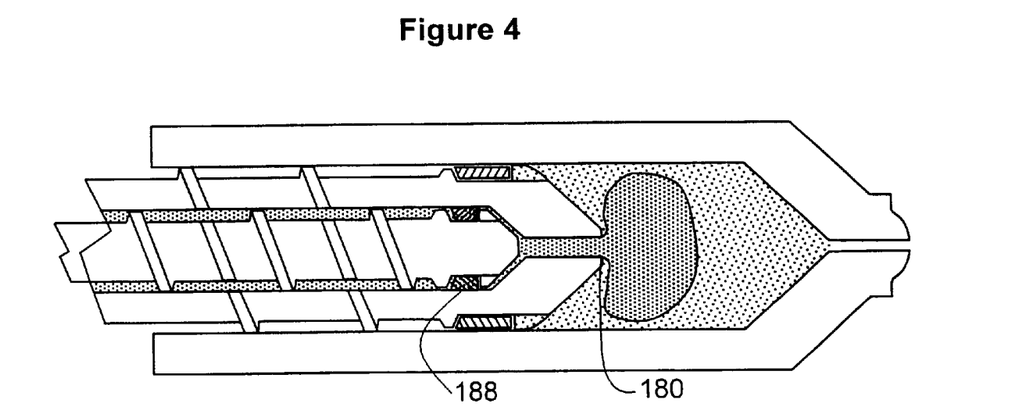
FIG. 4 is a schematic view of a ring-type non-return valve according to one embodiment of the present invention.
Figure 5:
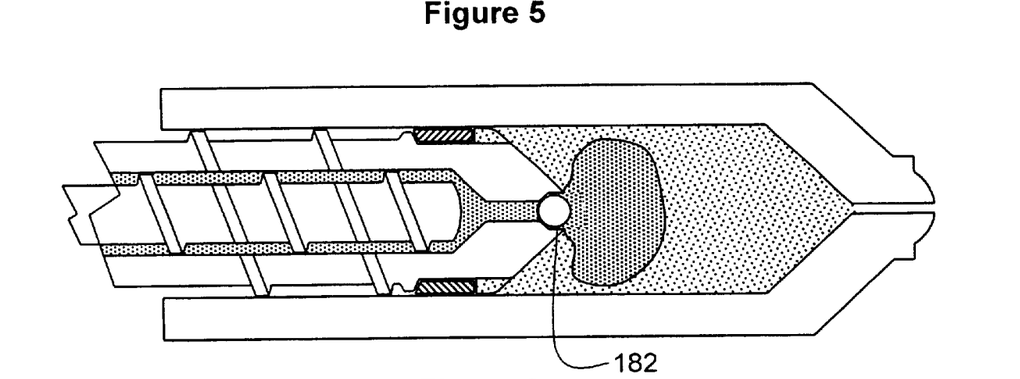
FIG. 5 is a schematic view of a ball-type non-return valve according to one embodiment of the present invention.

One important aspect of the present invention that is the system of check valves 136, 148. Although a primary function of a check valve is to prevent back-flow into the screw threads, development of the present invention has shown that the shape and configuration of the check valve 148 of the inner screw 130 has a substantial influence on the resulting product. Experimentation has shown that a simple hole 180 (FIG. 4) or a ball-check 182 (FIG. 5) produce a spherical front to the material in the inner screw 130. However, one preferred embodiment of the check valve has been shown to be a poppet type 184 (FIG. 6) with an annular exit path 186. One advantage of the poppet type valve 184 is the total isolation of inner screw 130 which allows the operation of the machine in a single-material mode, that is both screws 130,132 extruding the same material, with no chance of material contamination or degradation which may be created by unavoidable dead spots in the flow of materials caused by traditional multilayer mold machine designs.

Another important aspect of the present invention is that a later and more abrupt transition from skin material 142 to core material 106 during injection has been found to be desirable. This later and more abrupt transition has been achieved by extruding the charge of core material 106 in a torus or doughnut shape rather than a more spherical shape. Thus, if the core material 106 is extruded toward the periphery of the accumulation space and/or rearwardly, that is on the screw assembly side of the accumulation space 146, virtually all contamination of the skin material 142 by the core material 106 on the surface of the finished product can be avoided.

In embodiments of the present invention where the core material 106 is extruded from the outer screw 132, the torus shape is achieved by building the shot in reverse, that is, the skin material 142 is first extruded from the inner screw 132 and the core material 106 is then extruded from the outer screw 130 behind the extruded skin material 142 thereby forming the torus shape around the tip of the outer screw 132.

Figure 6:
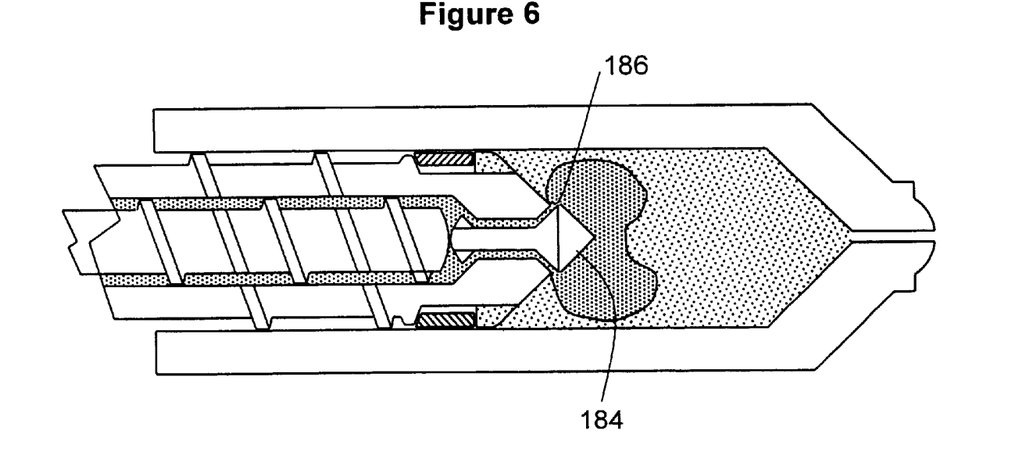
FIG. 6 is a schematic view of a poppet-type non-return valve according one embodiment of the present invention.

However, in other embodiments of the present invention the core material 106 is extruded from the inner screw 132 and the skin material 142 is extruded from the outer screw 132. This embodiment occurs, for example, when the inner screw 130 is fed core material 106 from feed throat 174 while the outer screw 132 is fed skin material 142 from feed throat 108. In these types of embodiments, to achieve the later and more abrupt transition, the poppet type valve 184 is desirably employed both to reduce the minimum amount of metal in contact with both melt streams thereby allowing for a more rapid switchover during injection, and to extrude the core material 106 toward the periphery of the accumulation space 146.

Figure 7:
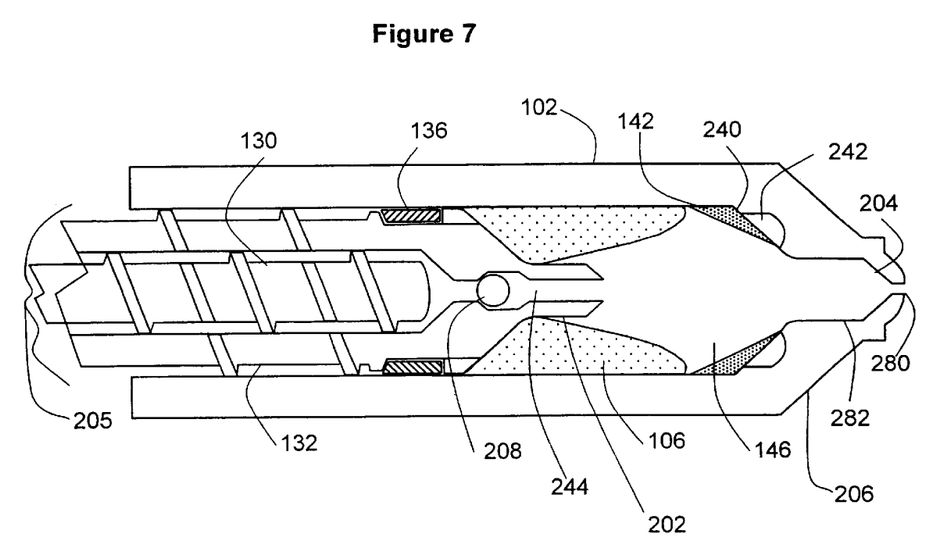
FIG. 7 is a schematic view of an outer screw providing an elongated protrusion outlet according to one embodiment of the present invention.

Further, as shown in FIG. 7, one embodiment of the present invention eliminates contamination of the outer surface of molded parts by traces of core material by use of an elongated tip 202 on the outer screw 132. At the beginning of an extrusion cycle, when the screw assembly 205 is fully forward, that is, the hydraulic cylinders 118 have pulled-in platen 114, the end of the elongated tip 202 is nearly in contact with the rear face 204 of the machine nozzle 206. Consequently, as skin material 142 is extruded out of the elongated tip 202, any traces of core material 106 remaining within the barrel 102 and nozzle 206 are forced back toward the rear of the accumulation space 146. Subsequent extrusion of core material 106 from the outer screw 132 will produce the desired toroidal shape to the interface between the two materials 106, 142. The elongated tip 202 can contain a check valve 208 of the ball, poppet, or ring type as discussed above.

In the embodiment of FIG. 7, heat to melt the skin material 142 in the inside screw 130 is conducted through the wall 172 of the outside screw 132. For this reason the process requires that the primary and secondary materials 106, 142 be processable at similar temperatures. Further heat is generated in the materials as the rotation of the inner screw imparts shear energy to the material. In fact, this shear source usually provides the greater part of the total heat absorbed by the melt.

According to the present invention, the inner screw 130 has a smaller diameter than the outer screw 132. The diameter may be limited by the strength of the hollowed out outer screw 132 in the feed section where the flights are the deepest. For example, the strength of a hollow screw has been defined by the following equation from *Injection Molding Handbook*, Rosato & Rosato, $2^{nd}$ edition, 1995:

$$D^3 + \frac{KT}{S} + d^3$$

where:
D=the root diameter of the feed section of the outside screw (inches/millimeters)
d=the maximum diameter of the hollow core (inches/millimeters)
T=the maximum torque applied by the drive motor (foot-pounds/newton-meters)
S=the tensile strength of the screw steel (pounds per square inch/bars)
K=a constant—102 for English system units, and 9.6 for metric units.

Thus, for example, a typical screw on a 68 ounce (1925 gram) machine has a diameter of 3.54 inches (90 millimeters). With a flight depth of 0.44 inches (11 millimeters) in the feed zone, the root of the screw is 2.66 inches (68 millimeters) in diameter. Such a screw is powered by a hydraulic motor capable of 4000 ft-lb (5440 newton-meters), and is composed of 4140 steel with a tensile strength of 100,000 pounds per square inch (6895 bars). Solving for the diameter of the inside hollow core in the equation yields a maximum diameter for the inner screw 130 of 2.45 inches (62 millimeters), which is 69% of the outer screw 132 diameter. The inside bore 138 could be even larger if the outer screw 132 were fabricated from one of the common high-strength screw alloys such as H13 or CPM-9V (tool steel alloys available from Crucible Materials Corporation of Syracuse, N.Y., the latter alloy containing chromium, molybdenum, and 9% vanadium) which has a tensile strength of 285,000 pounds per square inch (19,655 bars). H13 is a generic tool steel designation of the American Iron and Steel Institute (AISI).

The throughput rate of an extrusion screw is proportional to the square of its diameter, so a screw having a diameter ⅔ smaller than another screw will have only 44% of the throughput, other factors being equal. This deficiency is partially offset by the fact that the inside screw 130 will necessarily have a higher length/diameter ("L/D") ratio, which increases throughput. The typical outside screw will have an L/D ratio of 18–20 and the respective inside screw with have of a L/D ratio of 28–32. The L/D ratio of the outside screw 132 will decrease by as much as four diameters as the shot in the accumulation space 146 builds and the screw assembly 205 moves back further reducing its output rate. On the other hand, the inner screw 130 is always engaged to its full length. The smaller inner screw 130 can also be run at higher rotational speeds, further increasing its throughput. In general, extruder throughput is not a limiting factor for sandwich molded parts since these parts tend to have heavy wall sections, in which case cycle time is limited by mold cooling time, not extruder throughput.

One goal of the present invention is to provide a retrofit or rebuild option on a standard single-material injection molding machine. The only controlled event in the cycle of the present invention that does not happen in the molding cycle of a conventional single-material molding machine is the engaging and disengaging of the clutch mechanism 160. However, most conventional molding machines have the capability to apply selective back pressure with the injection cylinders 118 during various portions of the extrusion cycle. Back pressure is used to aid compaction and mixing of the melt. The inside screw 130, being axially fixed with relation to the outside screw 132, has no need for externally applied back pressure. Therefore, the selective application of back pressure can be the signal and force for closing the clutch mechanism 160.

Figure 8:
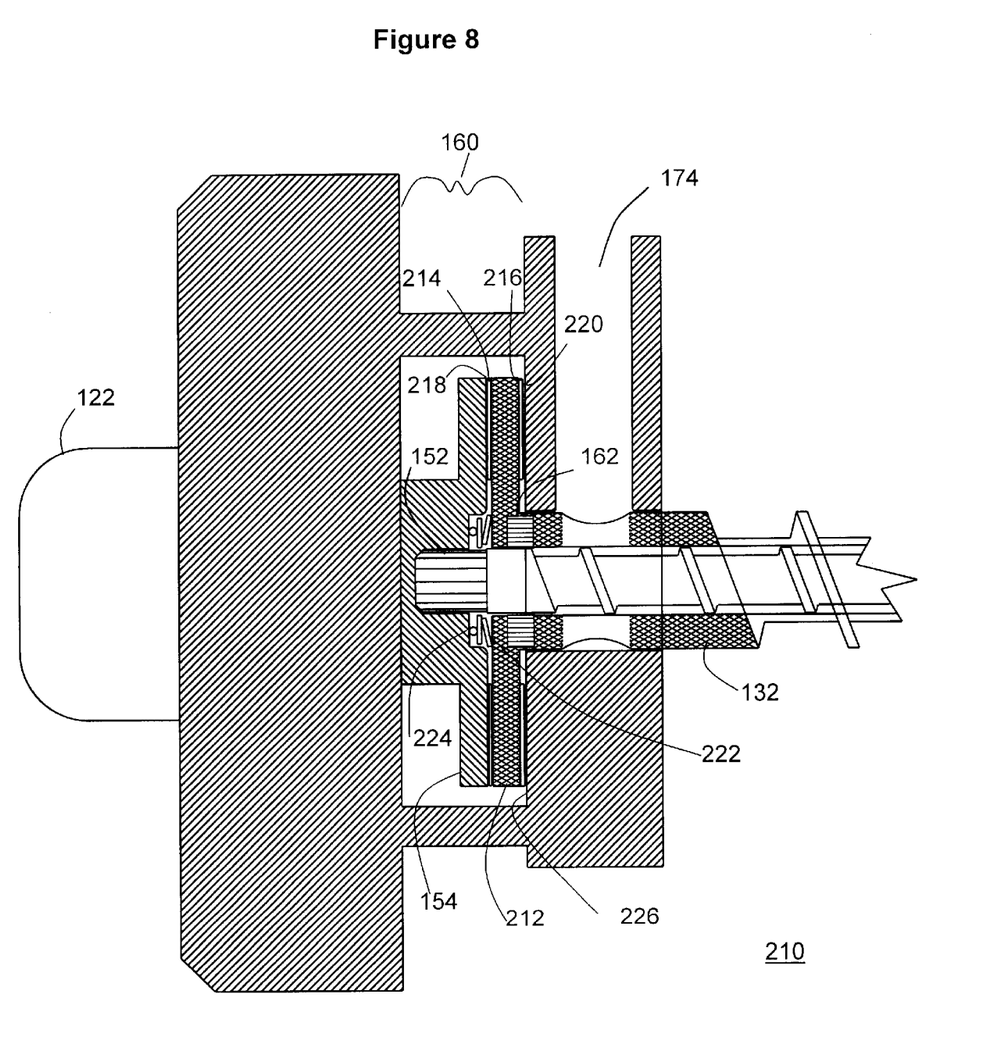
FIG. 8 is a schematic view of one embodiment of the present invention employing a clutch mechanism for a retrofit situation which uses conventional hydraulic back pressure controls of a traditional single barrel molding device to actuate the clutch and brake.

FIG. 8 shows a preferred embodiment of such a retrofit clutch mechanism assembly 210. A disc-shaped member 212 is fixed to the end of the outer screw 132 by means of a splined or keyed connection 162. The disc 212 is provided with friction material on both faces 214, 216. The disc 212 is enclosed between the spline shaft 154 of the rotational drive motor 122 and the rear side 226 of the secondary feed hopper 174, with just enough clearance so that disc 212 may rotate freely. Surfaces adjacent to the disc 212 are also provided with friction material 218, 220. When back pressure is applied by the hydraulic cylinders 118 to the platen 114, the spline shaft 154 presses against disc 212 which is connected by splines 162 to the outer screw 132. In this way, the retrofit clutch mechanism 160 is closed and the outer screw 132 rotates at the same speed as the spline shaft 154. The clutch mechanism 160 remains closed while the composite melt accumulates in front of the screw assembly 205 so long as sufficient back pressure from the hydraulic cylinders 118 and the accumulating melt is maintained. When the back pressure is relieved by reducing the oil pressure in the hydraulic cylinders 118, a Belleville spring 222 and roller bearing 224 between the spline shaft 154 and the disc 212 presses the disc 212 against the rear side 226 of the feed hopper 174, thereby providing braking action. A Belleville spring 222 is a disc spring with a conical steel washer capable of holding high compressible forces. As an example, the 68 ounce (1925 gram) machine described above has a total back pressure adjustable from 0 to 29,000 pounds (0 to 129,000 newtons). In that example the Belleville spring 222 would be pre-loaded to about 2000 pounds (8900 newtons), or approximately the lowest commonly used back pressure.

However, in one preferred embodiment of the present invention, the spring 222 and roller bearing 224 were not needed since the pumping action of the inner screw 130 relative to the outer screw 132 and the resistance of an inner check ring 188 provides sufficiently strong forward pressure to hold the clutch disc 212 tightly against the secondary feed hopper 174 thereby providing sufficient braking action to prevent the outer screw 132 from rotating.

Conventional software provided with molding machines can be used to control this retrofit clutch mechanism assembly 210. Typically, such software provides at least two steps of screw rotation (revolutions per minute) and back pressure control. For example, the single motor rotational drive 122 can turn a 100 revolutions per minute with no pressure for 75% of the recovery stroke to cause the inner screw 130 to extrude skin material 142. Then, the single motor rotational drive 122 can turn at 50 revolutions per minute and 125 pounds per square inch (8.6 bars) of hydraulic oil back pressure which engages (closes) the clutch mechanism to cause the outer screw 132 to extrude core material 106. Additionally, timing holes (not shown) can be provided on the circumference of the disc 212 to determine if the clutch mechanism 160 is properly engaged.

Figure 9:
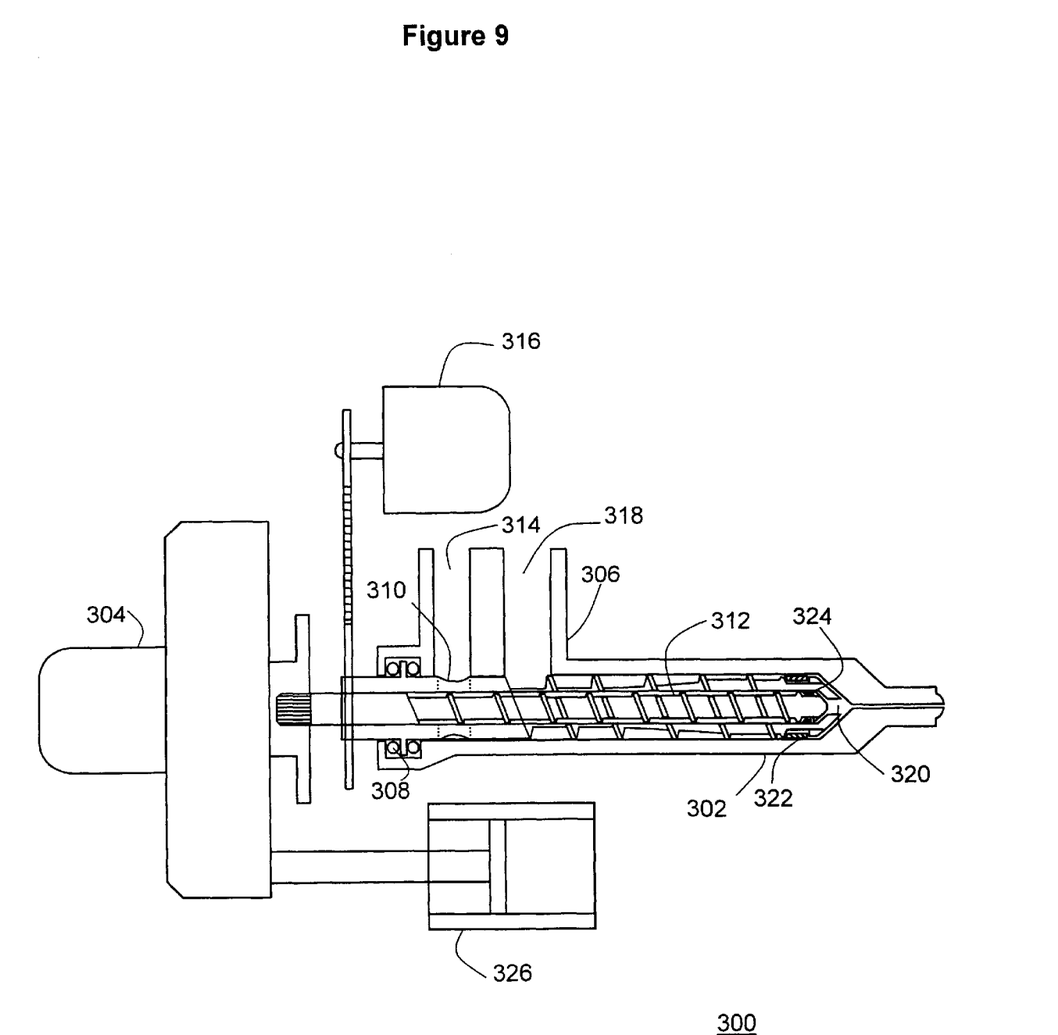
FIG. 9 is a schematic view of another embodiment of the present invention utilizing a gearing mechanism instead of a clutch.

An alternative embodiment of the present invention is shown in FIG. 9 for applications in which injection force is limited and/or the diameter of the injection screw is desirably minimized such as on an electric molding machine 300 where the injection pressure is transmitted by a ball screw rather than a hydraulic cylinder.

In this embodiment, outer screw 302 is selectively rotated by independent drive motor 316. The outer screw 302 remains in one position axially with respect to the feed housing 306 and is allowed to rotate on bearings 308. Openings 310 through the outer screw 302 allow communication between the inner screw 312 and the secondary feed hopper 314.

During screw recovery, drive motor 304 causes inner screw 312 to rotate, drawing material from feed hopper 314. Material thus accumulating at the downstream end of inner screw 312 causes this inner screw to be forced back with respect to the outer screw 302. Independently, drive motor 316 causes outer screw 302 to rotate, drawing material from feed hopper 318. This further material also accumulates in the common space 320 downstream of inner screw 312.

When sufficient material has accumulated to fill the desired mold cavity, linear actuator 326 which may be, for example, a hydraulic cylinder or ball screw, causes inner screw 312 to travel in an axial direction, injecting the accumulated material into the mold. Non-return valves 322, 324 at the downstream end of both screws 302, 312 prevent back flow of material during injection.

One aspect of multilayered parts is to plug-off, that is, encapsulate the core material 106 within the skin material 142 of the finished part at the end of a shot. The present invention largely achieves plug-off from the skin material 142 lodged in the dead area 240 at the forward periphery of the barrel 102. This dead area skin material does not flow until the outer screw 132 displaces the skin material 142 in the dead area 240 at the end of the injection of the shot into the mold. The angle of the taper and the viscosity of the resin melt (plastic) affects how this dead area skin material flows.

One option to more explicit control of the extent of plug-off flow can be accomplished by making a well 242 in the face of the nozzle end cap 242 that would not be in the flow path until physically displaced by the incoming outer screw 132. Another option is to telescope the end of the elongated tip 202 such that the elongated tip would contact the inner face 204 of the nozzle and pump skin material 142 from the space 244 between the inner check valve and the elongated tip 202. Yet another option for plug-off is to fix the inner check valve 208 to the inner screw 130 and provide an additional stroke of the inner screw after the outer screw 132 reaches the forward stop. In all these plug-off options, the extent of the plug flow is the difference in the screw position between the onset of the fixed physical switch-over point and the final variable stopped position of the screw assembly 205 when the mold is full. This so-called cushion position is dictated by the difference between the physical mold volume and the shot size.

While the clutch mechanism 160 has been described in terms of a back pressure controlled disc 212, any externally powered and controlled clutch could be used. Thus, the clutch mechanism 160 could operate pneumatically, with eddy currents, magnetically, or hydraulically. Furthermore, control of the clutch could be as simple as using a limit switch on a slider next to the platen 114, or an external computer determining a screw position through a linear encoder.

Also, each screw could be controlled by a respective independent rotation source or system of gearing, as shown in FIG. 9. If so provided, the rotation times of the screws can be overlapped which would save cycle time if the parts cool more quickly than the extrusion cycle time. Such overlapping could also benefit by reversing the flight direction of the inner screw so that the rotation of the outer screw will cause the inner screw to simultaneously extrude while the inner screw is held fixed by its own rotation source.

Alternatively, the outer screw could be axially fixed so that only the inner screw travels back during recovery, that is, for extrusion. While such an operation would require a separate thrust bearing for the outer screw and require a more complicated clutch mechanism because of the constantly changing distance between the barrel and the screw motor, higher injection pressure could be obtained since the smaller diameter inner screw would perform the injection.

Also, within the scope of this invention, more than two co-axial screws could be provided for additional layers given sufficient space, adequate steel strength for the screws, and room for plastic flow between the additional co-axial screws. Although the molding industry practice typically provides for a 20:1 L/D ratio for screws with a common range of 17:1 to 24:1, the extrusion industry has employed screws having L/D ratios ranging from 4:1 to 30:1. Thus, sufficient space can be provided for more than two co-axial screws. Further, all the inner screws need not extend to the front of the outer screw so long as the length of the barrel of each screw is sufficient, typically 18–20 diameters, to heat the melt.

While the embodiments of the present invention provided above utilize a single heater (primarily at start-up) from the non-flighted outside barrel to heat the melt, the inner screw could be independently heated along its axial bore. However, since most of the melting heat is produced by mechanical shear within the melt, some amount of independent heat control is possible by varying the shear rate of the two materials. However, use of such additional heat sources is not required by the present invention.

Also, the present invention has been primarily described in terms of injection molding. However, since reciprocating screws are used in other applications, such as for example, injection blow molding and extrusion blow molding, the present invention is applicable to such applications as well.

EXAMPLE 1

A Milacron injection molding machine (Model Vista V85 initially equipped with a with an 85 ton toggle clamp and a 45 millimeter diameter barrel having a volume of 9.6 ounces (272 grams), and a screw, available from Milacron Inc., Cincinnati, Ohio) was converted in accordance with the present invention. A 25 millimeter inner screw 130 with a L/D ratio 40:1 was positioned within a hollow 50 millimeter outer screw 132 having a L/D ratio of 18:1 which in turn were positioned within a barrel 102 having a bore 104 of 50 millimeters. The nozzle's restricted orifice 280 has 0.125 inch (3.2 millimeters) diameter and the wider nozzle section 282 has a 0.50 inch (12.7 millimeters) diameter. When the screw assembly 205 is fully forward, the tip of the elongated section 202 is about 0.06 inches (1.5 millimeters) from the back face 204 of the orifice 280. This close proximity causes the break between the liquid and solid state of the plastic to be near the restricted orifice 280 thereby causing virtually all of the accumulated melt to be removed with the sprue when the mold opens. This process leaves the nozzle 206 clean for the next accumulation to begin. A shorter, but wider bore of 0.625 inch (15.8 millimeters) was also tried with good results.

A two cavity mold produced identical parts each having an average wall thickness of 3.8 millimeters and a weight of 45 grams. Impact copolymer polypropylene mixed with 1% white color concentrate was introduced through the inner screw 130 as skin material 142. Regrind copolymer polypropylene mixed with 1% blue color concentrate for identification purposes was introduced through the outer screw 132 as core material 106. Barrel temperature was 4000 Fahrenheit (2050 Celsius) Skin material 142 was extruded into the common accumulation space 146 at 100 revolutions per minute ("rpm") and zero back pressure, up to 55% of the finished shot length. Core material 106 was extruded at 40 rpm and 100 pounds per square inch (6.9 bars) back pressure for the balance of the shot. Parts were produced that contained 45% blue core material totally enclosed by white skin material.

EXAMPLE 2

The demonstration of Example 1 was repeated except that a mold producing two parts weighing 102 grams apiece was used. Using the same combination of materials, parts containing 30% regrind core material by weight were produced.

EXAMPLE 3

The machine and mold described in Example 1 were used to produce a part containing 30% polypropylene homopolymer core covered with skin of Dupont Elvax ethylene/vinyl acetate elastomer (available from Dupont Corp., Wilmington, Del.) Barrel temperatures were reduced to 3750 Fahrenheit (1900 Celsius).

EXAMPLE 4

The machine and mold described in Example 1 were used to produce a part containing 30% polypropylene homopolymer core covered with a skin of AES Santoprene thermoplastic rubber (available from Advanced Elastomer Systems, Akron, Ohio). Barrel temperatures of 3850–4000 Fahrenheit (1950–2050 Celsius) were used.

EXAMPLE 5

The machine of Example 1 was used to sequentially fabricate large 8 ounce (226 gram) polypropylene parts. Each of these parts require a 5.05 inch (128 millimeter) stroke (horizontal movement) of the 50 millimeter screw. Because each part requires 60 seconds to cool in the mold, the accumulation of each shot can occur while the previous shot is cooling.

More specifically, in this Example 5, injection of a previous shot takes approximately 3 seconds after which the injection pressure is held for an additional 5 seconds to allow the sprue portion to solidify under pressure. Then the pressure is relieved and the screw motor turned on without back pressure for approximately 30 seconds during which time the inner screw 130 extrudes the skin material 142 for the next shot through the elongated tip 202 into the accumulation space 146. When the screw assembly 205 is 3.79 inches (96 millimeters) (about 75% of stroke length) from the rear of the restricted orifice 204, back pressure is applied at 125 pounds per square inch (8.6 bars). This back pressure causes the spline bushing 154 to contact the clutch plate (disc) 212 of the outer screw to rotate and extrude core material 106 through the outer check ring 136 for approximately 10 seconds. When the full 5.05 inch (128 millimeter) stroke is complete, the rotational drive motor 122 turns off, stopping rotation, the back pressure is relieved, the mold opened to eject the previous part, and the new shot injected.

While the present invention has been described in terms of specific embodiments, this invention encompasses all variations and modification, including expedients by those skilled in the art, which come within the spirit of the specification and the scope of the appended claims.

What is claimed is:

1. A machine for forming objects comprising:
   a first rotatable screw having threads for operating on material which forms at least a part of the object, the threads arranged in a selected direction;
   a second rotatable screw having threads for operating on material which forms at least a part of the object, the threads arranged in the selected direction;
   a single barrel containing the first rotatable screw and the second rotatable screw;
   a linear drive for causing axial movement of the first rotatable screw and the second rotatable screw;
   a single screw drive for selectively causing rotation of the first rotatable screw and the second rotatable screw; and
   a single clutch for selectively connecting the single screw drive to one of: (1) the first rotatable screw; and (2) both the first rotatable screw and the second rotatable screw.

2. A machine as in claim 1 wherein:
   the first rotatable screw and the second rotatable screw are substantially coaxial.

3. A screw assembly for a machine for forming multi-material objects comprising:
   an outer screw for operating on a first material, the outer screw having a hollow inner section; and
   an inner screw for operating on a second material positioned substantially within the hollow inner section of the outer screw;
   wherein the outer screw includes a non-return valve to prevent backflow of material into the hollow inner section of the outer screw.

4. A screw assembly as in claim 3, wherein:
   the non-return valve is selected from the group consisting of: a ball type valve, and a poppet type valve.

5. A machine for forming objects comprising:
   a hollow barrel defining a longitudinal direction;
   a screw for operating on a material in the barrel and having a tip and an outlet for extruding material from another screw, the screw movable in the longitudinal direction; and
   a nozzle having an orifice for passage of material directly into a mold and a tip portion for receiving the tip of the screw, the tip portion having a rear face defining a shape which allows the tip to nearly contact the rear face of the tip portion proximate the orifice, such that material from the tip is extruded closer to the orifice than other material in the tip portion.

6. A machine as in claim 5, wherein:

the screw comprises a hollow bore which continues into a passageway through the tip to the outlet in the tip.

7. A machine as in claim 5, wherein:

the another screw is positioned within the hollow bore of the screw for operating on the material in the hollow bore.

8. A machine as in claim 5, wherein:

the nozzle further comprises a storage area for retaining material until the tip substantially reaches the rear face.

9. A method of forming multi-material objects comprising the steps of:

engaging a screw drive by connecting a single clutch to a first rotatable screw for operating on material which forms at least a part of the object having threads arranged in a selected direction to extrude a first material into an accumulation space;

engaging the screw drive by connecting the single clutch to the first rotatable screw and a second rotatable screw, the second rotatable screw for operating on material which forms at least a part of the object having threads arranged in the selected direction to extrude a second material into the accumulation space forming a composite shot; and injecting the composite shot into a mold by axial movement of the first screw and the second screw caused by a linear drive.

10. The method of claim 9, wherein:

the step of engaging the screw drive to cause the first screw to extrude comprises the step of increasing pressure on a clutch disc; and the step of engaging the screw drive to cause the second screw to extrude comprises the step of decreasing pressure on the clutch disc.

11. A method of plugging-off a multi-material object having a core material encapsulated by a skin material comprising the steps of:

filling a storage area in at least one of a barrel and a (nozzle with a portion of a skin material, the storage area positioned adjacent a path of an elongated tip of an injector;

moving the injector axially such that the elongated tip of the injector is received into a tip portion of the nozzle thereby injecting skin material and core material of a composite shot into a mold; and further moving the injector such that another portion of the injector moves into the storage area thereby causing injection of the portion of skin material into the mold to plug off the object.

12. A method of plugging-off a multi-material object having a core material encapsulated by a skin material comprising the steps of:

filling a storage area in an elongated tip of an injector with a portion of skin material;

moving the injector axially such that the elongated tip of the injector is received into a tip portion of the nozzle thereby injecting skin material and core material of a composite shot into a mold; and then extruding the portion of skin material from the storage area into the mold to plug off the object.

13. A method of forming a multi-material object comprising the steps of:

causing a screw in a hollow barrel to extrude a material from another screw into an accumulation space in the hollow barrel, the screw having a tip with an elongated shape and an outlet through which the material is extruded;

moving the screw along a longitudinal direction of the hollow barrel to force material for forming the object out of the hollow barrel through a nozzle, the nozzle having an orifice for passage of the material directly into a mold and a tip portion, the rear face of the tip portion defining a shape which substantially conforms to the shape, of the tip, whereby at the end of the movement the tip nearly contacts the rear face proximate the orifice; and causing the screw to extrude additional material through the outlet near the rear face thereby rearwardly displacing material remaining in the tip portion.

14. A method as in claim 13, wherein the stop of causing the screw to extrude further comprises the step of:

rotating the another screw.

* * * * *